United States Patent [19]

Boenig

[11] Patent Number: 4,599,519
[45] Date of Patent: Jul. 8, 1986

[54] SUPERCONDUCTING MAGNETIC ENERGY STORAGE FOR ASYNCHRONOUS ELECTRICAL SYSTEMS

[75] Inventor: Heinrich J. Boenig, Los Alamos, N. Mex.

[73] Assignee: The United States of America as represented by the United States Department of Energy, Washington, D.C.

[21] Appl. No.: 610,904

[22] Filed: May 16, 1984

[51] Int. Cl.$^4$ .............................................. H02J 3/36
[52] U.S. Cl. ........................................ 307/22; 307/66; 307/82; 363/14; 363/35
[58] Field of Search ............... 363/14, 35, 51; 307/22, 307/64, 82, 66, 72–75, 104

[56] References Cited

U.S. PATENT DOCUMENTS

| | | | |
|---|---|---|---|
| 4,122,512 | 10/1978 | Peterson et al. | 363/14 |
| 4,340,823 | 7/1982 | Miyazawa | 307/66 |
| 4,459,492 | 7/1984 | Rogowsky | 363/55 |

FOREIGN PATENT DOCUMENTS 9263  1/1982  Japan ..................... 363/35

OTHER PUBLICATIONS

Peterson et al., "Superconducting Energy Storage Inductor-Converter Units for Power Systems," IEEE Transactions on Power Apparatus & Systems, Jul.-/Aug. 1975, vol. PAS-94, No. 4.

Hassenzahl, "Superconducting Magnetic Energy Storage," Proc. of the IEEE, Sep. 1983, vol. 71, No. 9, pp. 1089–1098.

Rogers et al., "30-MJ Superconducting Magnetic Energy Storage System for Elect. Utility Transmission Stab.", Proc. of the IEEE, vol. 71, No. 9, pp. 1099–1107, Sep. 83.

Primary Examiner—William H. Beha, Jr.
Attorney, Agent, or Firm—Leonard C. Brenner; Paul D. Gaetjens; Judson R. Hightower

[57] ABSTRACT

A superconducting magnetic energy storage coil connected in parallel between converters of two or more ac power systems provides load leveling and stability improvement to any or all of the ac systems. Control is provided to direct the charging and independently the discharging of the superconducting coil to at least a selected one of the ac power systems.

8 Claims, 4 Drawing Figures

SUPERCONDUCTING MAGNETIC ENERGY STORAGE FOR ASYNCHRONOUS ELECTRICAL SYSTEMS

This invention is the result of a contract with the Department of Energy (Contract No. W-7405-ENG-36).

BACKGROUND OF THE INVENTION

The present invention relates generally to power transmission systems and more particularly to providing superconducting magnetic energy storage for two or more ac power transmission systems.

An asynchronous tie (AST) is an electrical connection in the form of a high voltage direct current (HVDC) link used for power transmission between two ac systems that differ at least in one of the three characteristic parameters of an ac system: amplitude, frequency or phase. Such ac systems cannot be connected directly. An AST generally consists of two ac/dc converters connected by two conductors. Power of the first ac system is rectified in the first converter, inverted in the second converter and consumed in the second ac system. By proper control of both converters, the energy flow between both ac systems is bi-directional. Because no energy storage is involved in AST, energy sent into one ac system is absorbed at the same rate in the second ac system for assumed lossless power transmission in the AST. Several ASTs are presently operating or being installed in the United States, see Hingoani, EPRI Journal, pg. 16 (January–February 1983).

A superconducting magnetic energy storage (SMES) device is capable of storing electrical energy in a magnet during a certain time period and then releasing the energy back into the electrical system over a different time period. The economic incentive for such a device is storing low cost, off-peak power and releasing that energy as peak power. In a typical SMES system, a superconducting magnet is interfaced to an ac system by an ac/dc converter. Energy from the ac system is absorbed in the superconducting coil and released back to the same ac system. The converter determines the role and direction of the energy flow. The principle of operation of a SMES system and its beneficial affect on an electric utility system has been shown, see U.S. Pat. No. 4,122,512. The first large scale SMES unit in the world was recently installed by the Los Alamos National Laboratory in Tacoma, Wash., see Rogers, IEEE Proceedings (1983).

It is an object of the present invention to provide superconducting magnetic energy storage for a plurality of asynchronous electrical systems.

It is a further object of the present invention to provide load leveling and stability improvement in a plurality of independent ac systems using a single superconducting magnetic energy storage coil.

SUMMARY OF THE INVENTION

To achieve the foregoing and other objects, and in accordance with the purpose of the present invention, as embodied and broadly described herein, a superconducting magnetic energy storage coil is connected in parallel between two converters of an asynchronous tie connection between two independent ac systems. A control system directs the charging and discharging of the superconducting magnetic energy storage coil as desired to provide load leveling and stability improvement to either or both ac systems. In an alternate embodiment more than two independent ac systems are so connected.

An advantage of the present system is that a single superconducting magnetic storage coil can provide load leveling and stability improvement to a plurality of independent ac systems.

Another advantage of the present system is that low cost, off-peak energy from one power system can be stored and consumed as expensive peak energy in another system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE PREFERRED EMBODIMENT

Figure 1:
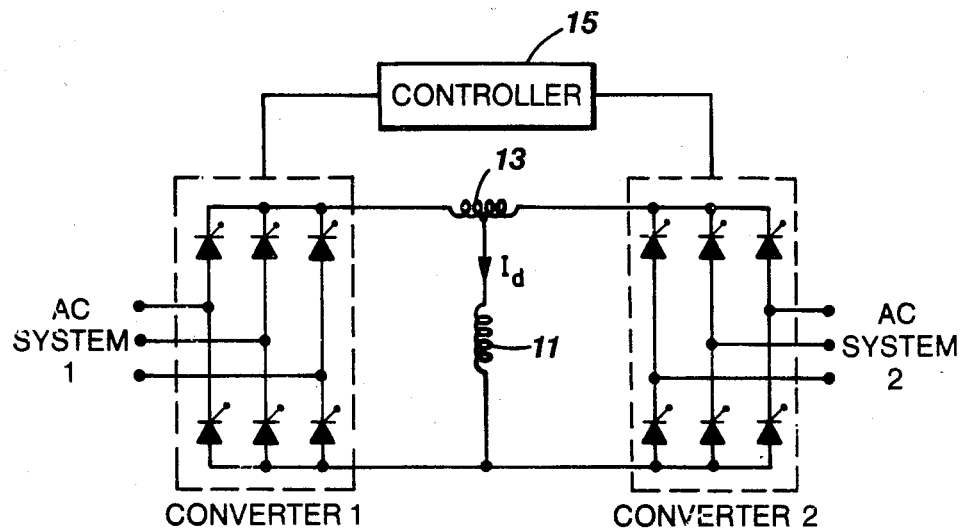
FIG. 1 is a diagram showing a superconducting magnetic energy storage system for two asynchronous electrical systems.

With reference to FIG. 1, it can be seen that a superconducting coil 11 is inserted in parallel between converter 1 and converter 2 of ac systems 1 and 2. Preferably, the coil 11 is connected to the center of the small coil 13 functioning as an interphase reactor. As with a conventional superconducting magnetic energy storage (SMES) system, ac system 1 can charge the superconducting coil 11 through converter 1. Likewise, ac system 2 can charge the coil 11 through converter 2. Either converter 1 or converter 2 can discharge the coil 11 to ac system 1 or 2 respectively. While either converter 1 or 2 is charging or discharging the coil 11 the other converter 2 or 1 is in a blocking state acting as an open switch, thus preventing ac system 1 or 2 from interfering with the storage operation in the other system. Simple conventional control is provided by controller 15.

If energy from one ac system is to be stored in the coil 11 and transferred into the other ac system, the following control sequence has to be followed for the assumed state that the charging converter (either 1 or 2) charges the coil 11. The coil current $I_d$ has a direction as shown in FIG. 1, dictated by converter current conduction. To discharge the coil 11 into the other ac system through its converter, the current has to be commutated out of the charging converter into the discharging converter by phase angle control. This may be accomplished in at least two different ways. First, the voltage of the discharging converter can be made slightly higher than the voltage of the charging converter for a short time (10 ms). A circulating current through both converters forces the coil 11 current in the charging converter to zero. Alternately, the voltage of the charging converter can be made negative and one phase of the discharging converter can be gated so that the discharging converter acts as a free-wheeling path for the coil 11 current, forcing the current in the charging converter to zero. Once the coil 11 current is in the discharging converter, the voltage is made negative and the coil 11 is discharged. Also, the circuit of FIG. 1 can be used to charge the coil 11 simultaneously from both converters and to discharge the coil 11 simultaneously into both ac systems. As is known from conventional converter theory, the parallel operation of two converters will require an interphase reactor 13, as shown in FIG. 1. The size of the interphase reactor 13 is preferably $10^{-6}$ times smaller than the storage coil 11, and does not influence the normal energy storage and transfer operation.

Figure 2:
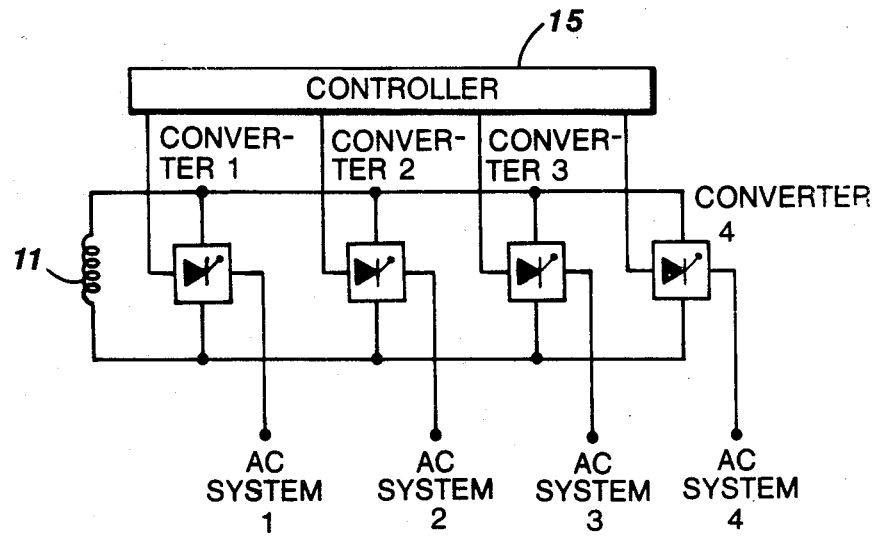
FIG. 2 is a diagram showing a superconducting magnetic energy storage system for a plurality of independent ac systems.

With reference to FIG. 2, it can be appreciated the benefits of the present invention may extend to a plurality of independent ac systems. By way of example, FIG. 2 illustrates four independent ac systems benefiting from one superconducting coil 11. The operating modes for a single superconducting magnetic energy storage coil 11 operating multiple independent ac system environments is derived as a simple extension from the above described procedure for two asynchronous ac systems.

Figure 3:
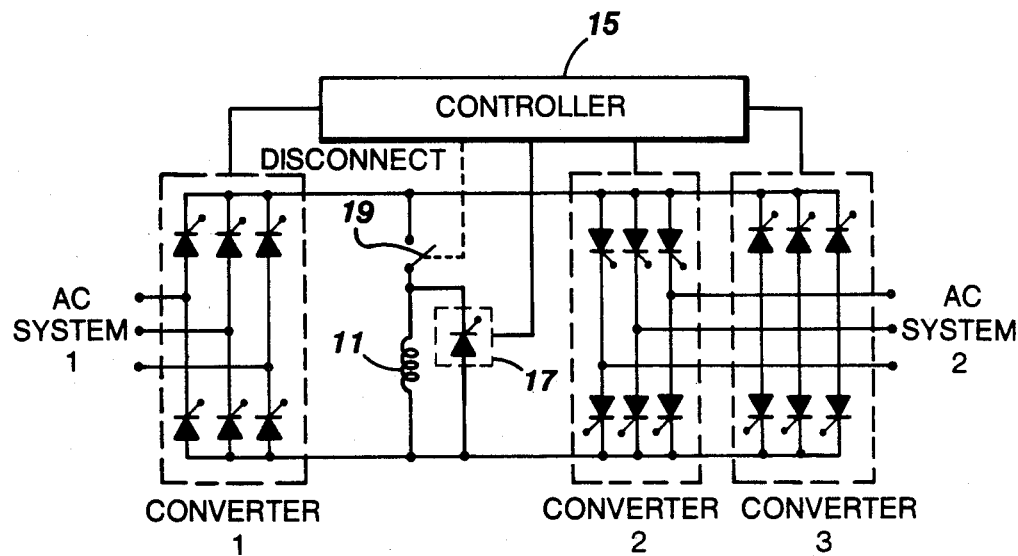
FIG. 3 is a diagram showing a combined asynchronous tie system and superconducting magnetic energy storage system.

The present invention is also useful in a combination circuit which can function both as an asynchronous tie (AST) and a superconducting magnetic energy storage system for asynchronous electrical systems, see FIG. 3. Operation in both modes cannot be accomplished simultaneously but has to happen successively in time. Switchover from one mode of operation into another is within a few milliseconds. The combined circuit consists of three conveters, the coils 11, a bypass 17, and a no-load disconnect 19. To explain the operation, two examples are given that include a change of operating modes.

First assume the circuit in FIG. 3 operates as an AST. Converter #1 and #2 conduct current. The no-load disconnect switch 19 is open. The existing coil current $I_d$ circulates through the bypass 17. Converter #3 is blocked. If, suddenly, a load in ac system #2 is dropped, then ac system #2 does not want to absorb the AST power, but the energy from ac system #1 ought to be stored in the coil 11. The control sequence for this case is the following: The no-load disconnect switch 19 is closed and the converter #2 voltage is made more negative than the positive voltage of converter #1. The current in converter #2 ceases to flow and the coil 11 is charged by the ac system #1.

Second, assume ac system 2 is charging the coil 11. In this state, converter #1 and #2 are blocked; converter #3 conducts the coil charging current. The no-load disconnect switch 19 is closed. To transfer from a storage mode into an AST mode, the coil 11 current first has to be commutated out of converter #3 into the bypass 17. That is accomplished by making converter #3 voltage negative for a few milliseconds, during which time the bypass 17 starts conducting. After the current is bypassed, the no-load disconnect switch 19 is opened, which isolates the storage coil 11 from all three converters. Converter #1 and #2 are now energized to assume AST operation. The total switching time from one operation mode to another, as shown in these two examples, preferably has a duration of less than 20 to 50 ms.

Figure 4:
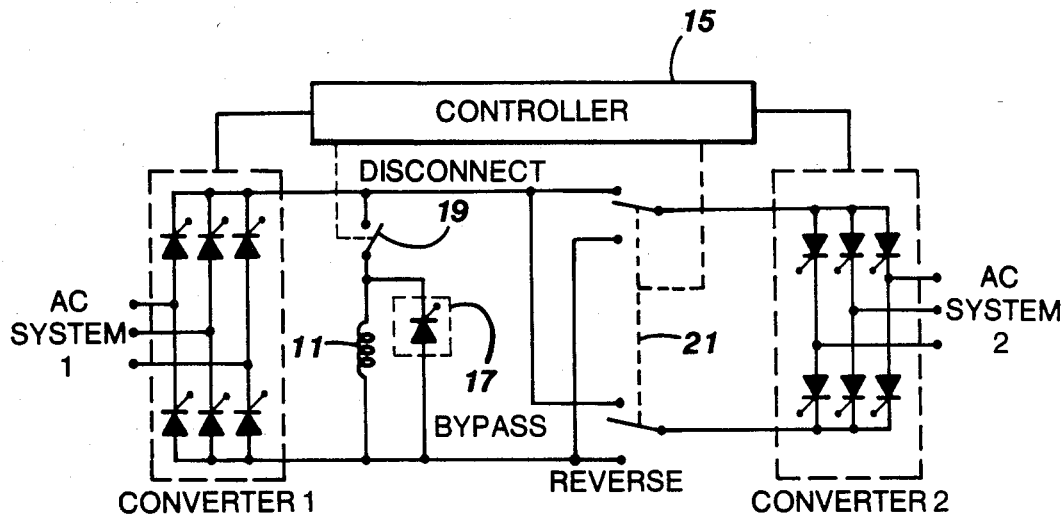
FIG. 4 is a diagram showing an alternate circuit for the system of FIG. 3.

Alternately, in systems in which slow switching times are allowable, the antiparallel converter configuration (converter 2 and 3) of FIG. 3 can be replaced by one converter and a mechanical reversing switch 21, see FIG. 4. The control for circuit in FIG. 4 always has to provide a current path for the coil 11 current during operating mode switchover.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for providing superconducting magnetic energy storage for both a first and a second asynchronous electric system comprising:
   (a) a first converter connected to and associated with the first asynchronous electrical system, said first converter having a first and a second conductor output;
   (b) a second converter connected to and associated with the second asynchronous electrical system, said second converter having a first and a second conductor output, said second conductor output connected to said second conductor output of said first converter;
   (c) a interphase reactor having a first and a second end terminal and a tapped terminal therebetween, said first end terminal connected to said first output conductor of said first converter and said second end terminal connected to said first output conductor of said second converter;
   (d) a superconducting magnetic electric storage device connected between said tapped terminal of said interphase reactor and said second output conductors of said first and second converters; and
   (e) means for controlling said first and second converters whereby either asynchronous electric system may charge said superconducting magnetic energy storage device and either asynchronous electrical system may receive the energy stored therein.

2. The apparatus of claim 1 wherein said superconducting magnetic energy storage device includes a superconducting coil.

3. The apparatus of claim 2 wherein the reactance of said superconducting coil is very much greater than the reactance of said interphase reactor.

4. The apparatus of claim 3 wherein the reactance of said superconducting coil is on the order of one million times the reactance of said interphase reactor.

5. A combined asynchronous tie system and superconducting magnetic energy storage system for a first and second asynchronous electrical system comprising:
   (a) a first converter connected to and associated with the first asynchronous electrical system, said first converter having a first and a second conductor output;

(b) a second converter connected to and associated with the second asynchronous electrical system, said second converter having a first and a second conductor output, said first and second conductor outputs connected to said first and second conductor outputs respectively of said first converter;

(c) a third converter connected to and associated with the second asynchronous electrical system, said third converter having a first and a second conductor output, said first and second conductor outputs connected to said first and second conductor outputs respectively of said first converter, said third converter being in an antiparallel configuration with respect to said second converter;

(d) a superconducting magnetic electric storage device having a first end and a second end; said second end thereof connected to said second conductor outputs of said first, second, and third converters;

(e) a disconnect switch connected between said first end of said superconducting magnetic energy storage device and said first conductor outputs of said first, second, and third converters;

(f) a bypass device connected to said first and second ends of said superconducting magnetic energy storage device to permit current circulation therethrough when said disconnect switch is open; and (g) means for controlling said first, second and third converters, said disconnect switch, and said bypass device whereby either asynchronous electric system may charge said superconducting magnetic energy storage device and either asynchronous electrical system may recieve the energy stored therein when said disconnect switch is closed and whereby an asynchronous tie is provided between said first and second asynchronous electrical system when said disconnect switch is open.

6. The apparatus of claim 6 wherein said superconducting magnetic energy storage device includes a superconducting coil.

7. A combined asynchronous tie system and superconducting magnetic energy storage system for a first and second asynchronous electrical system comprising:

(a) a first converter connected to and associated with the first asynchronous electrical system, said first converter having a first and a second conductor output;

(b) a second converter connected to and associated with the second asynchronous electrical system, said second converter having a first and a second conductor output;

(c) reversing switch means interposed between said first and second conductor outputs of said first and second converters for providing selectively a direct and a reversed connection therebetween;

(d) a superconducting magnetic electric storage device having a first end and a second end; said second end thereof connected to said second conductor output of said first converter;

(e) a disconnect switch connected between said first end of said superconducting magnetic energy storage device and said first conductor output of said first converter;

(f) a bypass device connected to said first and second ends of said superconducting magnetic energy storage device to permit current circulation therethrough when said disconnect switch is open; and (g) means for controlling said first, second, converters, said reversing means, said disconnect switch, and said bypass device whereby either asynchronous electric system may charge said superconducting magnetic energy storage device and either asynchronous electrical system may receive the energy stored therein when said disconnect switch is closed and whereby an asynchronous tie is provided between said first and second asynchronous electrical system when said disconnect switch is open.

8. The apparatus of claim 7 wherein said superconducting magnetic energy storage device includes a superconducting coil.

* * * * *